United States Patent [19]

Yap

[11] Patent Number: 4,927,357

[45] Date of Patent: May 22, 1990

[54] METHOD FOR GAS LANCING

[75] Inventor: Loo T. Yap, Princeton, N.J.

[73] Assignee: The BOC Group, Inc., Murray Hill, New Providence, N.J.

[21] Appl. No.: 420,441

[22] Filed: Oct. 12, 1989

Related U.S. Application Data

[60] Division of Ser. No. 310,161, Feb. 16, 1989, which is a continuation-in-part of Ser. No. 176,488, Apr. 1, 1988, abandoned.

[51] Int. Cl.$^5$ .............................................. F27B 3/22
[52] U.S. Cl. ........................................ 432/22; 431/10; 432/19
[58] Field of Search ................... 432/19, 22, 196, 198; 431/10, 190

[56] References Cited

U.S. PATENT DOCUMENTS 3,488,700  1/1970  Iken et al. ........................... 432/111
4,741,694  5/1988  Mason et al. ........................ 432/105

Primary Examiner—Carroll B. Dority
Attorney, Agent, or Firm—Carol A. Nemetz; R. Hain Swope; Larry R. Cassett

[57] ABSTRACT

A gas-injection lance, burner, and method for use in a high temperature heating system which provides a non-axisymmetric flow of a reaction-rate enhancing gas in sufficient proximity to the flame of the system, which extends over the surface to be heated, to create an aerodynamically reduced pressure field sufficient to deform the flame and displace it in the direction of the surface to be heated. The present method provides substantially enhanced heating with the virtual elimination of hot spots.

5 Claims, 11 Drawing Sheets

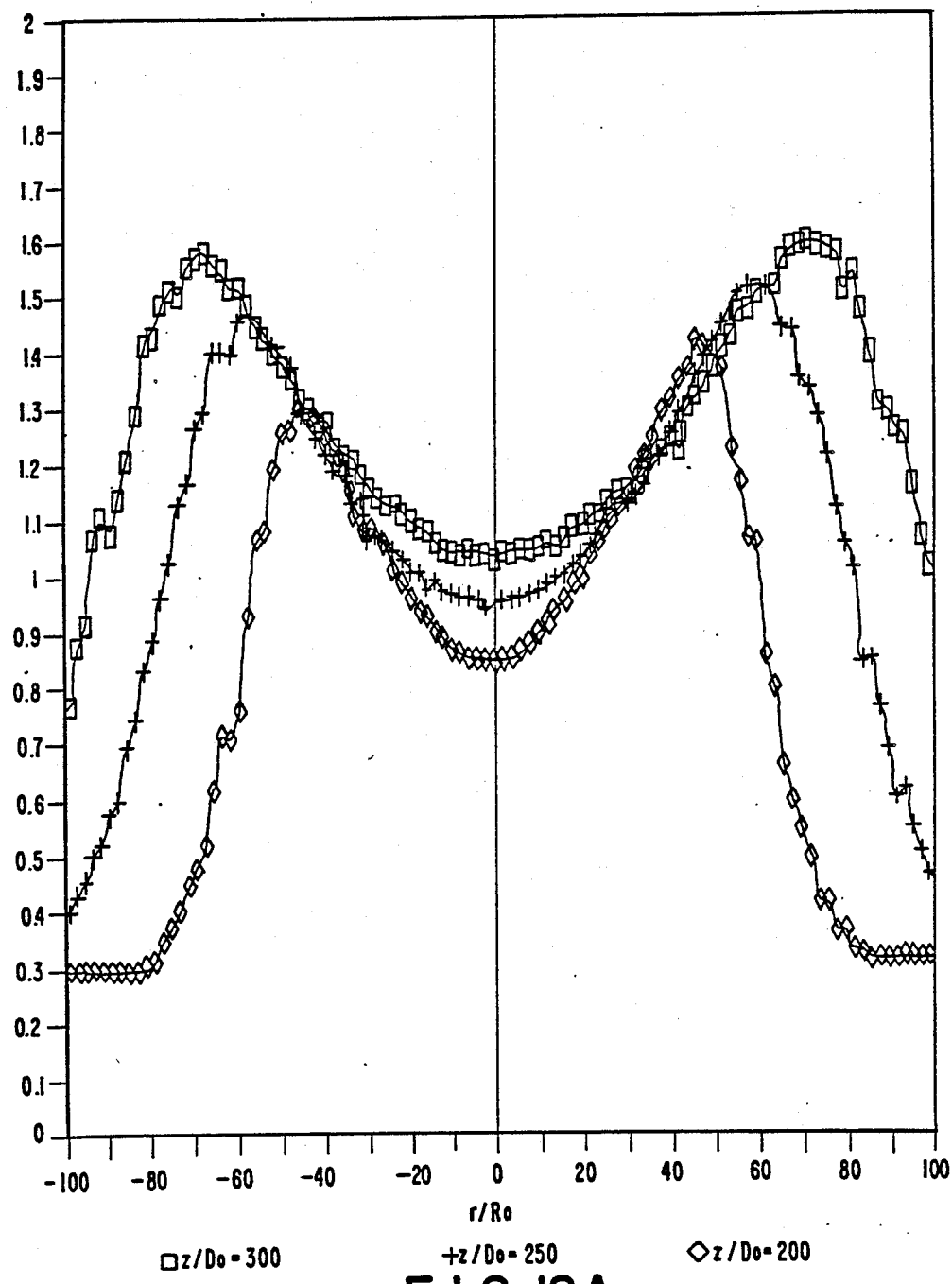

METHOD FOR GAS LANCING

RELATED APPLICATIONS

This is a division of application Ser. No. 310,161 filed Feb. 16, 1989, which is a continuation-in-part of U.S. patent application Ser. No. 176,488, filed Apr. 1, 1988 now abandoned.

FIELD OF THE INVENTION

The present invention relates to an improved method of optimizing heat transfer to a thermal load utilizing a novel gas-injecting lance and arrangement thereof with a burner or incorporated as part of a burner, particularly in a direct-fired system. The introduction of a reaction-rate enhancing gas in accordance with the invention produces uniform, controlled, enhanced transfer of heat while avoiding undesirable hot spots. The method and apparatus of the invention results in favorable flame enhancement, flame shape deformation and flame positioning.

BACKGROUND OF THE INVENTION

Generally, efficiencies in direct-fired industrial processes, for example, the making of glass are limited by the mechanics of heat transfer. Heat transfer is relatively efficient for thermal loads in the vicinity of the flame. However, in practical applications the thermal load is not located concentrically around the flame as would be desirable for efficient heat transfer. Instead, most thermal loads accept heat flux through planar or moderately curved surfaces such as the horizontal surface of a glass/metal melt in a glass/melt furnace, the vertical wall of a heat exchanger in a boiler or the curved surface of a charge of granular material in a rotary-kiln furnace.

It is known that the addition of a reaction-rate enhancing gas improves the heat transfer of a direct-fired system. The term "reaction-rate enhancing gas" as used herein includes any gas that will influence the desired reaction in a positive manner, for example, oxygen, oxygen-enriched air, mixtures of oxygen and other gases such as acetylene, and the like. This is because the flame temperature and thereby the transfer of heat from the flame to the thermal load will be increased. Additionally, the reduction of nitrogen flowing through the combustion system diminishes exhaust loses.

Although the addition of a reaction-rate enhancing gas increases heat transfer efficiency, there have been efforts to improve heat transfer by altering the relative positioning of the burner and the pipe or lance used to transmit the rate-enhancing gas to the system. Conventionally, an oxygen jet flow is introduced between the flame and the thermal load through an axisymmetirc lance with the ejection port of the lance typically positioned adjacent the burner. As used herein, the term "axisymmetric" means that a cross-section of the gas jet or flame at the point of exit from the lance or burner taken perpendicular to the longitudinal axis of the flow of the jet or flame is essentially circular. "Nonaxisymmetric" means that the cross-section is essentially non-circular.

In such systems, the introduction of oxygen using an axisymmetirc lance results in the formation of a narrow, pencil-shaped, high-temperature zone along the length of the flame. The heat flux to the thermal load is greater from the oxygen-intensified zone than from the rest of the flame. As a result, the thermal load is exposed to high localized heat fluxes which result in unevenly heated areas in the thermal load, conventionally referred to as "hot spots". Uneven heating limits the efficiency and capacity of the furnace and adversely affects product quality.

Another method of improving heat transfer is disclosed in Bienus et al U.S. Pat. No. 4,444,586. An axisymmetric oxygen/fuel lance is directed perpendicular to the melt surface in a reverberatory furnace for melting copper so that the flame is in head-on contact with a portion of the copper. The flame is produced by an axisymmetric oil atomizer with a (concentric) coannular oxygen supply. This arrangement produces enhanced heat transfer only very local to the area of flame impingement on the copper.

The average static pressure in a jet of a reaction-rate enhancing gas is lower than the ambient pressure; how much lower being dependent on the density and velocity of the jet flow. This observation can be derived from a quantitative analysis of the governing momentum equations.

Virtually all flames produced in industrial furnaces are essentially isobaric (low Mach number). This can be ascertained by focusing on the flow across the flame on a length scale of the order of the flame thickness. In such an analysis, flame curvature can be neglected, even for turbulent flames. A standard order-of-magnitude analysis leads to the conclusion that the viscosity effects on the pressure drop across the flame can be neglected as well.

Applicant has discovered that the reduced static-pressure field induced by a dense (cold) jet can efficiently displace and deform an isobaric, less dense hot flame. By appropriately positioning the jet between the thermal load and the flame, and by employing a nonaxisymmetric jet, the flame is drawn toward the low static-pressure field induced by the colder jet. The flame is also deformed toward the nonaxisymmetric shape of the cold jet. This results in more favorable flame placement and geometry control which increases the efficiency of the flame to transfer heat to the entire thermal load without the formation of hot spots.

The term burner as generally known and used herein describes a device which emits a fuel or a fuel in combination with an oxidant. The lance emits a rate-enhancing gas in the desired proximity to the flame generated with said burner.

The burner disclosed in accordance with the present invention includes not only a fuel outlet to emit a fuel alone or a fuel in combination with an oxidant, but also a gas lance through which a reaction rate-enhancing gas is emitted.

In either case, the desired objects of the invention can be obtained by use of the above-described novel lance/burner combination or the novel burner.

In addition, a nonaxisymmetric shaped fuel outlet or burner outlet may be employed, preferably having a shape similar to the lance. As a result, the fuel as well as the gas jet momentum and relative flame direction allow greater control over the flame position, shape and temperature which leads to even more favorable heat-transfer characteristics over conventional lancing arrangements and techniques.

It is therefore an object of the invention to provide a method of more uniformly enhancing the heating of a thermal load by employing an improved lance/burner apparatus.

It is a further object of the invention to provide a lance alone or in combination with a fuel burner or incorporated as part of a burner capable of ejecting a nonaxisymmetric profile of gas to interact with an axisymmetric or nonaxisymmetric flame to thereby deform and displace the flame and increase the efficiency of heat transfer thereof over the entire thermal load.

It is a further object of the invention to provide an lance/burner combination which produces a flame which can uniformly heat a thermal load without the formation of hot spots.

It is another object of the invention to provide a flame with the desired characteristics through the use of a burner containing a lance.

It is an additional object of the invention to provide a furnace including a lance/burner combination or a burner having a lance incorporated as part of the burner capable of producing a flame which uniformly covers the thermal load and is more efficient in heat transfer than known systems.

SUMMARY OF THE INVENTION

The present invention is directed to a method of enhancing heat transfer to a thermal load utilizing a lance for ejecting a reaction-rate enhancing gas having an inlet end and terminating in a nonaxisymmetric distal or gas outlet end. The outlet end has a substantially wider opening than the inlet end and a flattened profile to thereby provide for a nonaxisymmetric outflow of said gas.

In particular, the lance has an inlet end, an outlet end having a nonaxisymmetric profile and a passageway connecting the inlet end and the outlet end. The exit of the outlet end is defined by a pair of outermost opposed points such that a plane passing through the outermost opposed points is non-parallel to a plane bisecting the lance and the burner. Thus, the flame and the gas jet are oriented in such a manner that optimum flame deformity and displacement are obtained.

The novel lance of the present invention may be used with a conventional axisymmetric burner or with a nonaxisymmetric burner preferably having a shape similar to the shape of the lance to thereby generate a curved or flat flame which is more readily adapted to effect uniform heat transfer. As previously indicated, the lance may be part of the burner and, therefore, the lance may be combined with an axisymmetric or nonaxisymmetric fuel outlet which emits a fuel alone or a fuel in combination with an oxidant, e.g. oxygen or air within the scope of the invention.

The present invention is also directed to an apparatus for providing uniformly enhanced heat transfer to a large surface (with respect to the unbalanced flame surface) to be heated, i.e., a thermal load, comprising a burner providing a flame extending substantially along the longitudinal axis of the burner in either conventional or nonaxisymmetric form and a gas-ejecting lance located between the burner or the fuel outlet of the burner and the thermal load, the gas-ejecting lance having a nonaxisymmetric outlet end, as defined above. The lance is between the burner and the thermal load and positioned with respect to the flame in a manner which insures that the gas jet will deform and displace the flame to uniformly heat the thermal load.

The nonaxisymmetric gas jet creates an aerodynamically reduced static-pressure field between the flame and the thermal load. This reduced pressure field draws the flame toward the gas jet, i.e., displaces the flame. Hence, for example, by directing the gas jet close to the thermal load, the flame can be positioned close to the thermal load. Additionally, the nonaxisymmetric flow deforms the flame transversely to produce a high temperature flattened flame having a more uniform temperature profile. These desired characteristics are more pronounced when the burner or the fuel outlet of the burner is also provided with a nonaxisymmetric profile, especially when the shape of the fuel outlet of the burner is similar to that of the lance.

The lance includes a passageway for the flow of gas therethrough. The passage may be a single nonaxisymmetric channel or a plurality of channels, wherein one or more channels may have an axisymmetric cross-section. In each case, the gas flow out of the lance must provide a nonaxisymmetric profile.

For example, the outlet end of the lance may have a rectangular or ellipsoid cross-section. The rectangular-shaped outlet end is preferably used in a conventional high-temperature furnace having a planar heating surface, while the ellipsoid-shaped outlet end is particularly suited for use in a rotary kiln wherein the surface of the thermal load is curved.

The burner or fuel outlet may be constructed with any nonaxisymmetric profile, but preferably has a shape similar to the shape of the lance. Matching shapes provide for optimum contact between the flame and the gas jet thereby inducing optimal convective and radiant heat transfer.

Those skilled in the art will appreciate that at a point distant from the burner, there may be a degree of deforming of a nonvertically oriented flame as a result of a combination of flame buoyancy and decay of velocity. The distance from the outlet of the burner where natural deforming of the flame occurs is dependent on such factors as the Froude number. It is to be understood that reference to the shape of the flame produced in accordance with the present method refers to the flame upstream of where the natural deformation takes place.

The invention is also directed to a high temperature furnace containing at least one burner system including the gas ejecting lance of the invention to provide a flame extending into said furnace which is capable of uniformly heating a thermal load.

BRIEF DESCRIPTION OF THE DRAWINGS

The following drawings in which like reference characters indicate like parts are illustrative of embodiments of the invention and are not meant to limit the scope of the invention as encompassed by the claims of the application.

FIG. 12A is a graph showing horizontal temperature profiles of a flame downstream of a burner in the absence of an oxygen jet;

DETAILED DESCRIPTION OF THE INVENTION

Current gas-lancing techniques position lances between the flame and the thermal load. Axisymmetric lances employed for this purpose do not force the flame in the direction of the thermal load.

Figure 1:
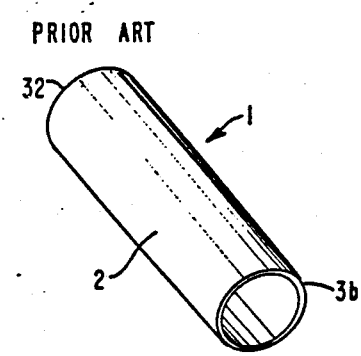
FIG. 1 is a perspective view of a typical axisymmetric lance of the prior art.

As shown in FIG. 1, a typical prior art gas lance 1 has a substantially cylindrical body 1, formed between axisymmetric inlet and outlet ends 3a and 3b, respectively, so that the lance 1 has essentially the shape of a cylindrical pipe.

In contradistinction, the novel gas lances utilized in the method of the present invention have an outlet end which is nonaxisymmetric, thereby resulting in the emission of a nonaxisymmetric gas flow.

Figure 2:
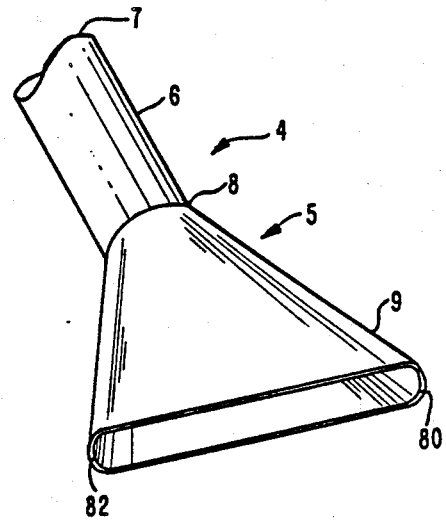
FIG. 2 is a perspective view of one embodiment of the gas lance of the present invention having a single channel for heating a planar surface.

Referring to FIG. 2, one embodiment of the lance 4 of the present invention includes an axisymmetric body 6 having an inlet end 7 and an opposed end 8 connected to a lance outlet end or tip 5 having an exit port 9. The lance tip 5 expands nonaxisymmetrically in the longitudinal direction from the opposed end 8 of the body 6 to the outlet end 5 to provide an exit port 9 which is substantially wider than the inlet end 7 and presents a flattened substantially rectangular profile. The exit port 9 includes a pair of reference points 80 and 82 positioned at opposed ends of the lance tip 5 which are used to position the lance 4 with respect to the burner to provide optimum displacement and deformity of the flame as explained hereinafter. The rate-enhancing gas, e.g. oxygen, jet stream emitted by the tip 5 is nonaxisymmetric and conforms to the substantially rectangular profile of the exit port 9.

In operation, the gas flows through the body 6 from the inlet end 7 in an axisymmetric profile. As the gas enters the tip 5 it assumes the nonaxisymmetric shape of the tip 5 to provide a nonaxisymmetric gas planar-like velocity profile exiting the exit port 9.

Figure 3:
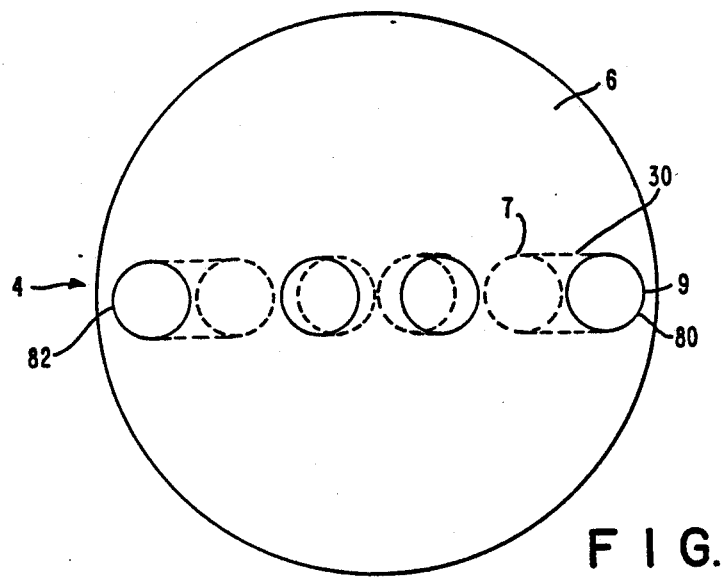
FIG. 3 is a perspective view of an embodiment of the gas lance of the present invention having multiple channels.

Another embodiment of the lance 4 provides a nonaxisymmetric profile of gas as shown in FIG. 3. The lance 4 includes a plurality of axisymmetric channels 30 housed in a substantially cylindrical body 6. Each channel 30 has an inlet end 7 and exit port 9 having reference points 80 and 82 from which is ejected an axisymmetric profile of gas. The channels 30 angle outwardly from the longitudinal axis of the body 6 so that the combined profile of the reaction-rate enhancing gas exiting the exit ports 9 of the channels 30 provides a nonaxisymmetric gas planar-like velocity profile as described above in connection with FIG. 2. The channels 30 may extend from the body 6 or be encased therein as shown in FIG. 3. The latter embodiment is preferred to provide extra protection for the channels 30 in the furnace environment.

Figure 4:
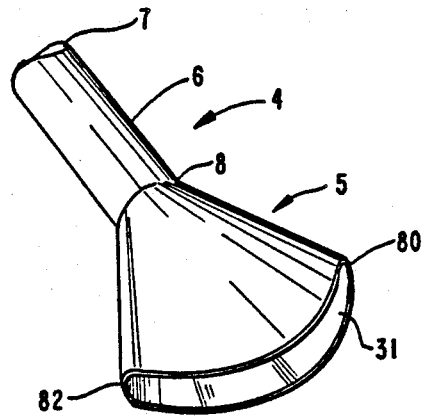
FIG. 4 is a perspective view of a single channel gas lance of the present invention for use in heating a curved surface.

The lance 4 may also have an ellipsoid-like shape to accommodate curved surfaces. Referring to FIG. 4, the tip 5 of the lance 4 has a single exit port 31, ellipsoid-like in shape, which is contemplated for use in a rotary kiln wherein the thermal load has a curved surface.

Figure 5:
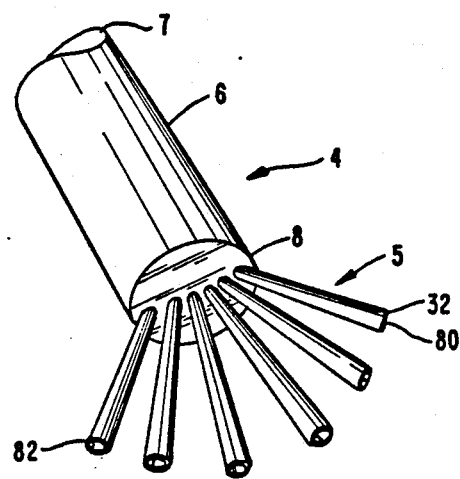
FIG. 5 is a perspective view of a multiple channel gas lance for use in heating a curved surface.

An embodiment of the lances 4 having an ellipsoid-like shape is shown in FIG. 5 wherein the gas jet stream flows out of individual axisymmetric channels 32. As described in connection with FIG. 3, the channels 32 may be in the body 6 and likewise provide a nonaxisymmetric ga profile.

Figure 6A:
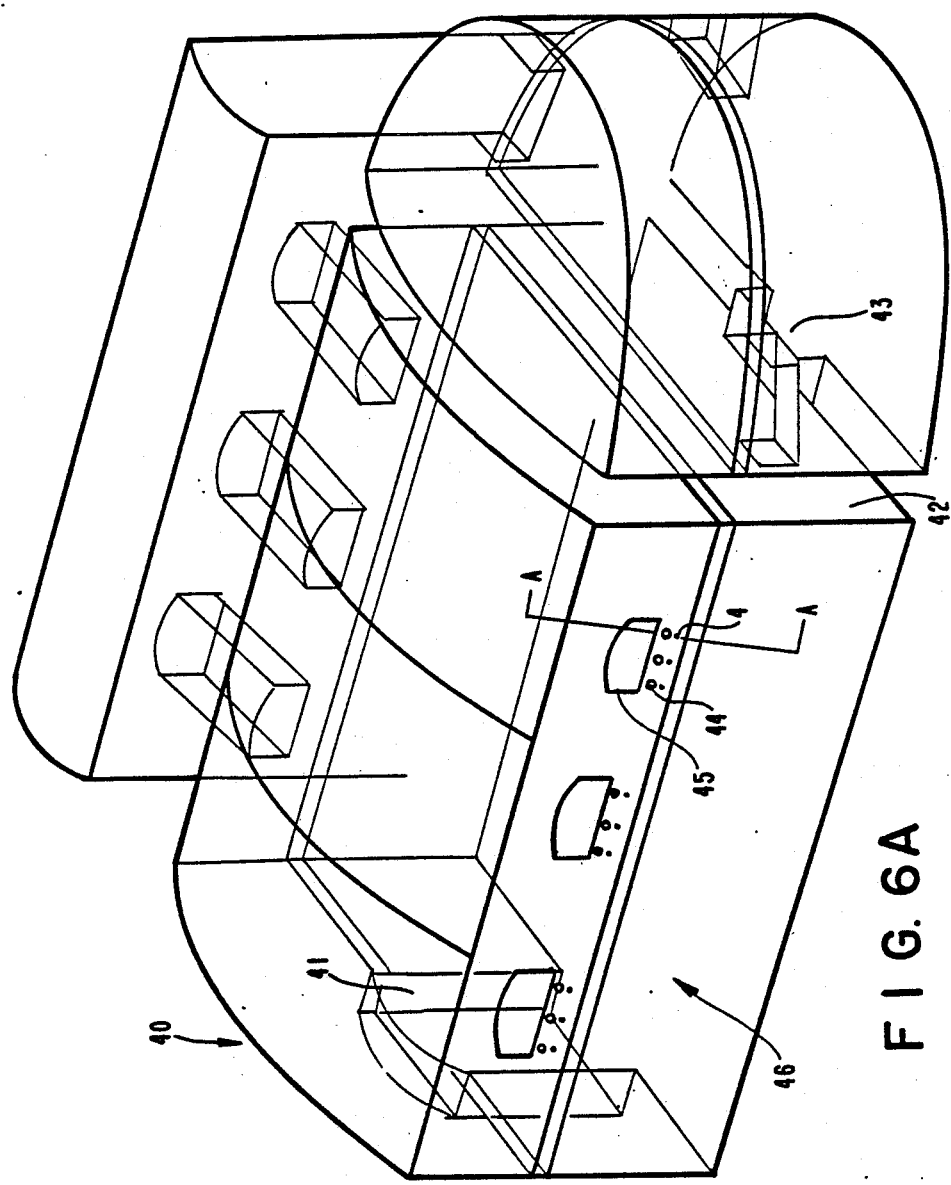
FIG. 6A is a perspective view of a high-temperature furnace showing an example of the positioning of the gas lance/burner combination of the present invention.

The relationship of the burner or the fuel outlet of the burner and gas lance in accordance with the present invention is shown in the environment of a typical glass furnace capable of producing 150 tons of glass per day. Referring to FIG. 6A, batch material is introduced into one end 41 of the glass furnace 40. The furnace 40 includes a throat 42 leading to a forehearth 43 in which the melted glass is transferred for final product manufacturing.

Nine burners 44, three under each of three air supply ports 45, fire simultaneously across the glass melt 46. Gas lances 4 of the type shown in FIG. 2 are placed below each of the burners 44 and set at an angle sufficient to both deform and displace the flame so that an essentially flat profile of a flame uniformly covers the entire thermal load. This provides a significantly enhanced heat-transfer rate while avoiding capacity limiting hot spots. The lances 4 may be set at an angle in the range of up to about $+45°$ heading into the flame and about $-45°$ away from the flame. Typically, good results are obtained when the jet is substantially parallel to the flame.

Figure 6B:
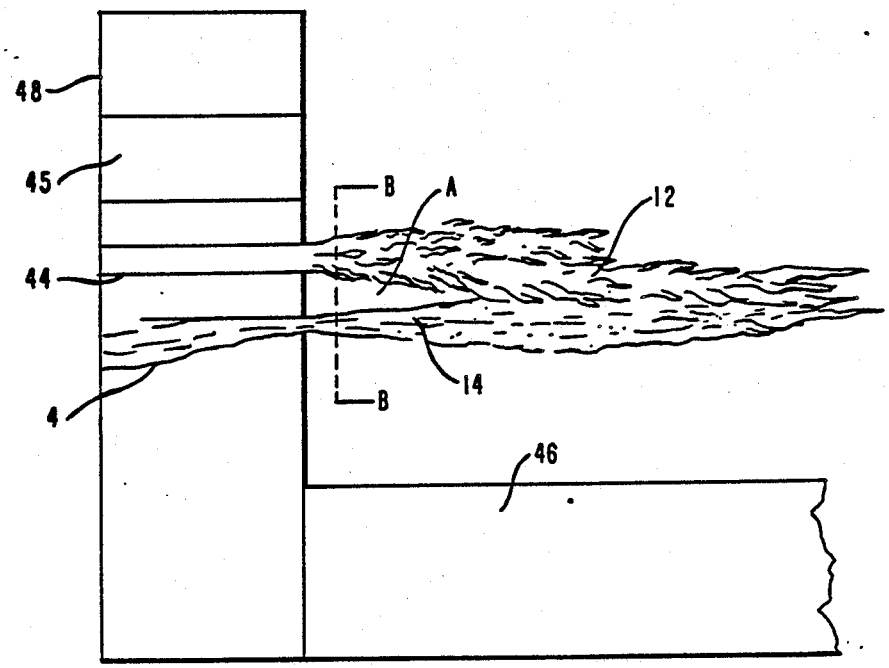
FIG. 6B is a cross-sectional view taken along line A—A of the burner/lance arrangement shown in FIG. 6A showing displacement and deformation of the flame.

FIG. 6B shows the deformation and displacement of the flame by the use of the gas lance 4 in the furnace environment described in FIG. 6A. More specifically, a wall 48 of the furnace 40 houses the air-supplying ports 45, burners 44, and the novel lances 4 of the invention. The lances 4 are positioned between the burners 44 and the heat transfer surface, i.e., the melt 46 is approximately parallel to the burner 44. The gas 14 which flows nonaxisymmetrically out of the lance 4 generates a low pressure field between the flame and the thermal load and draws the flame 12 downward over the melt 46 and flattens the flame 12 outwardly so that the flame 12 is uniformly spread over the entire melt 46.

Figure 7A:
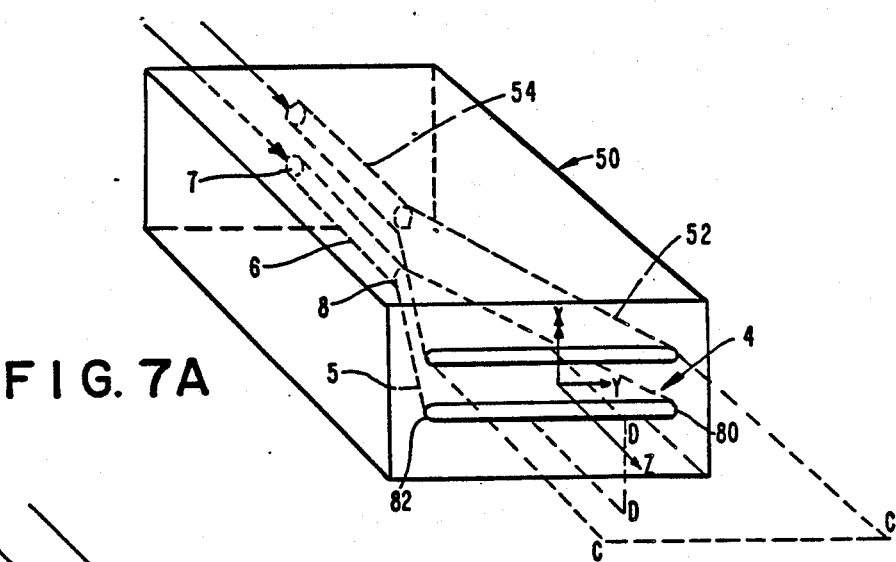
FIG. 7A is a partial cross-sectional view of a burner incorporating a gas lance in which both the gas lance and the fuel outlet have similarly shaped nonaxisymmetric outlet ends.
Figure 7B:
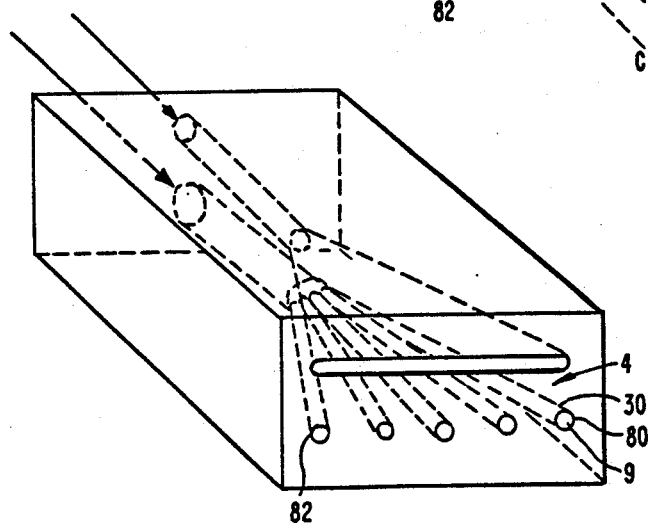
FIG. 7B is a partial cross-sectional view of another burner incorporating a lance in which the lance has the same configuration as shown in FIG. 3 and the fuel outlet is the same as that shown in FIG. 6A.
Figure 7C:
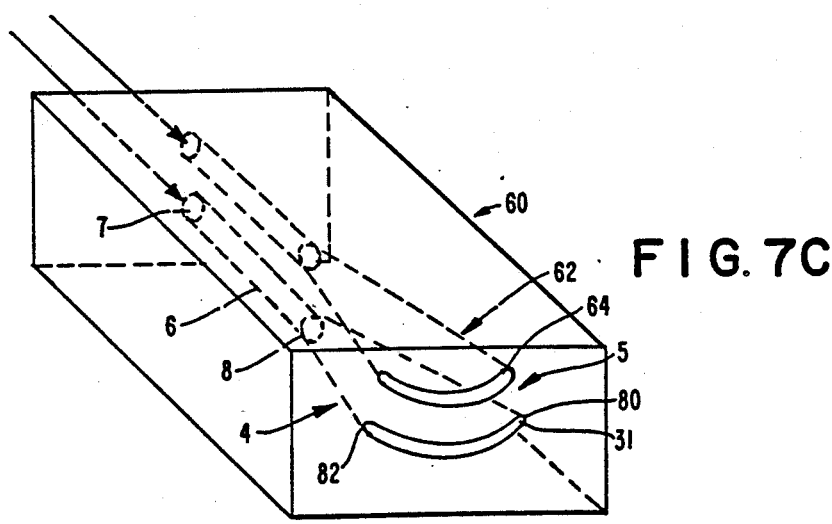
FIG. 7C is a partial cross-sectional view of still another burner incorporating a lance in which the fuel outlet and the lance each have a curved profile similar to that shown for the lance in FIG. 4.

FIGS. 7A–7C show an arrangement of a burner incorporating a fuel outlet and lance wherein each employs a non-axisymmetric outlet. More specifically, the arrangement of FIG. 7A employs a lance of the type shown in FIG. 2 within a burner 50 having a nonaxisymmetric fuel outlet 52 and an inlet end 54 which may be axisymmetric as specifically shown in FIG. 7A. In accordance with the invention, reference points 80 and 82 are positioned at the exit port 9. A plane C—C passing through the reference points 80 and 82 is not parallel (preferably perpendicular) to a plane D—D bisecting both the lance 4 and the fuel outlet 52. When the lance 4 is not part of the burner, the plane D—D will bisect both the lance and the burner.

FIG. 7B illustrates another arrangement in which a lance substantially as shown and described in connection with FIG. 3 is operatively positioned with respect to the fuel outlet substantially the same as that show in FIG. 7A. The arrangement of FIG. 7B emits a flame and a reaction rate enhancing gas, each of which has essentially the same flattened nonaxisymmetric profile, into the furnace.

FIG. 7C shows a burner incorporating a fuel outlet and a lance in which the lance is substantially the same as that shown and described in connection with FIG. 4. The burner 60 has a similar ellipsoid-shaped fuel outlet 62 with a single exit port 64 for use in a rotary kiln having the thermal load on a curved surface.

The embodiments shown in FIGS. 7A–7C result in a more geometrically uniform enhancement of radiant and convective heat transfer to the surface of the substrate. In addition, the aerodynamically reduced pressure field created by the gas jet can more easily draw the flame downward and position the flame closer to the surface of the substrate. However, it should be understood that acceptable results can be obtained using a axisymmetric burner with a nonaxisymmetric lance or a nonaxisymmetric burner and a nonaxisymmetric lance having different nonaxisymmetric profiles.

Figure 8:
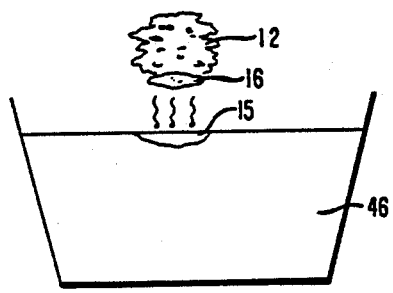
FIG. 8 is a schematic view of the relationship between the flame and thermal load in a prior art furnace with a planar heat-accepting surface.
Figure 9:
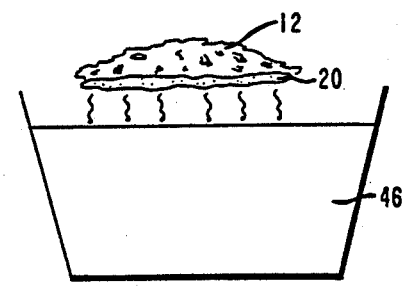
FIG. 9 is a schematic view of the relationship between the flame and the thermal load in furnace with a nonplanar heat-accepting surface in accordance with the present invention.

As shown in FIGS. 8 and 9, employment of the gas lance of the present invention which emits a nonaxisymmetric profile of gas displaces the flame downward toward the jet and flattens the flame so that a uniform flattened flame at maximum flame temperature covers the thermal load and eliminates undesirable hot spots.

Referring to FIG. 8, the prior art glass furnace using conventional axisymmetric gas lances positioned between the burners and the thermal load creates undesirable localized hot spots. More specifically, the glass melt 46 residing in the furnace 40 is heated by the flame 12 forming a mixing zone 16. The mixing zone 16 of an axisymmetric flow of gas and the flame 12 results only in locally enhanced heat-transfer which causes uneven heating and the production of hot spots 15, and may even cause overheating of the melt 46.

As shown in FIG. 9, a nonaxisymmetric gas lance positioned between the burner and the melt 46 as described above in connection with FIG. 6B generates a nonaxisymmetric mixing zone 20. The pressure-induced deformation of the flame 12 results in more uniform temperature enhancement over a larger surface area. In this manner, the local heat flux and hence the local thermal-load temperature is kept uniform.

It will be readily appreciated by one skilled in the art that axisymmetric lances used in heating curved surfaces such as a rotary kiln also produce localized hot spots. The use of a nonaxisymmetric gas lance of the type described in connection with FIGS. 4 and 5 is effective in eliminating hot spots on curved surfaces as well.

Essentially, the pressure field generated by nonaxisymmetric high-velocity reaction-rate enhancing gas jet or jets positioned between the flame and the thermal load is used to (a) position the flame more favorably with respect to the thermal load, (b) tailor the flame shape to the thermal load, and (c) enhance the flame temperature uniformly over a large area. These benefits lead to a result which is reflected by the substantial elimination of hot spots. Moreover, by virtue of the present invention, the need for manipulating the thermal load to compensate for the local hot spots frequently formed in conventional furnaces is substantially reduced, thereby providing a substantial cost savings.

EXAMPLE 1

Test comparing the subject nonaxisymmetric lances with conventional lances were conducted on a 9.2 m long by 7.1 m wide commercial glass furnace tank. Batch material was introduced at the doghouse end of the glass tank. As the batch was melted, the material moved toward the throat. Further refining took place in the working end. After the forehearth, the glass melt was ready for final product manufacturing. The fullrate of glass from the tank was 150–200 tons per day.

Three burners, one under each of the three ports provided for the necessary heat (17.5 GJ/hr.). The required air for combustion flowed through the regenerator, the ports, and over the burners (underport firing). An oxygen lance was mounted under each burner of port number three. The combustion gases were exhausted through opposite ports and regenerators. After a 15 minute cycle of firing from one set of ports, the firing side was reversed. In this manner, part of the exhaust energy of each previous cycle was recovered with the regenerators by preheating the combustion air.

Oxygen lances were mounted under each of the three burners of port number three on both firing sides. Conventional lances consisted of a stainless steel tube ID $\frac{1}{4}$ inch. Each lance introduced approximately 315 SLPM of oxygen at an average velocity of 165 m/s. This oxygen provided for 4.9% of the total necessary oxygen.

Novel lances of the present invention incorporated a tip with four high velocity channels which directed jets in a horizontal plane in a fan-like manner, i.e., a substantially rectangular outflow profile, of the type show in FIG. 3.

The choice of the oxygen-jet spread angle was based on the objectives of providing a flame-tailored amount of oxygen and a spacially wide low-pressure zone. The choice of the lance diameters was based on the objective to generate low-pressure zones which control the position, geometry, and spacial intensification of the flame. The lances selected were matched to the existing heavy fuel oil burners. These burners produced turbulent diffusion flames with jet spreading angles of approximately 20 degrees. Average velocities of the cold oxygen jets of approximately 255 m/s were estimated to generate sufficiently low pressures to meet the above objectives.

To evaluate the performance of the conventional as well as the nonaxisymmetric oxygen lances, temperature measurements were taken. Two methods were used.

First, a scanning IR pyrometer provided temperature profiles along a straight line. Essentially, IR field stops limited the view of a spacially scanning solid-state detector to a small solid angle (60 usr). The radiance measurements were converted into temperature measurements assuming black-body behavior. The widely used black-body assumption limits the quantitative interpretation of the data in the usual manner. Independent temperature measurements were conducted using an optical pyrometer.

Second, a video camera was used to obtain qualitative temperature measurements within the furnace during firing and reversal. Generally, at the typically high temperatures of a furnace, a video camera detector is near saturation and the recorded images lack contrast. However, the visible images were converted to thermal images by the use of a neutral-density filter.

Figure 11A:
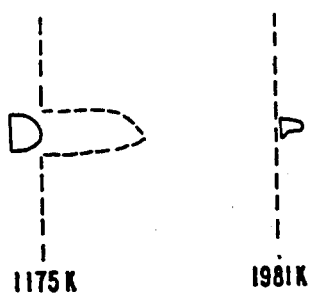
FIG. 11A is a vertical temperature profile across a flame produced by a prior art lance taken along the line B—B in FIG. 6B.

FIG. 11A shows a vertical temperature scan along line B—B in FIG. 6B for a burner and a conventional lance of the type shown in FIG. 1. As shown, the temperature peaked across the flame and the bottom temperature gradient was very steep. This was expected from the introduction of cold oxygen to the bottom part of the flame.

Figure 11B:
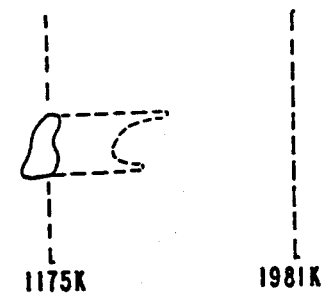
FIG. 11B is a vertical temperature profile across a flame produced by a lance of the present invention taken along the line B—B in FIG. 6B.

FIG. 11B shows a similar vertical temperature scan along B—B in FIG. 6B for a burner and the subject lance shown in FIG. 3. As shown in FIG. 11, two temperature peaks occur. The first temperature peak is where the main flame projected from the burner and the second temperature peak is located where the planar oxygen lance is positioned. This second temperature peak is the result of the attraction of combustible gases, oil droplets, and the flame by the low pressure field of the planar oxygen jet. It is this strong effect, which was not achieved with conventional lances, which enables favorable deformation and positioning of the flame.

Figure 10A:
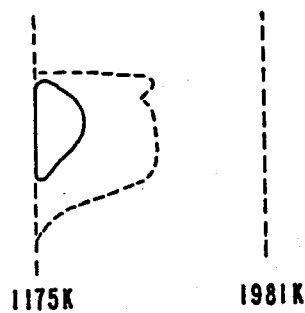
FIG. 10A is a horizontal temperature profile across the thermal load in the direction perpendicular to the flame direction as produced by a prior art lance.

Video thermography of the flames with conventional oxygen lances showed narrow, pencil-like hot temperature zones resulted in non-homogenous temperature profiles in the glass melt as shown in FIG. 10A as a result of locally high heat-fluxes.

Figure 10B:
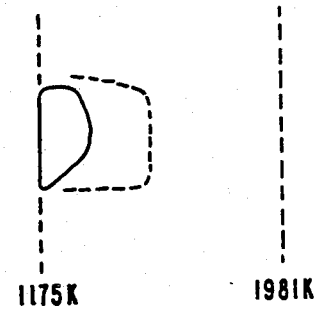
FIG. 10B is a horizontal temperature profile across the thermal load in the direction perpendicular to the flame direction as produced by a lance of the present invention.

Video thermography of the flames with the oxygen lance of the present invention showed uniformly enhanced flame-temperature profiles. The absence of hot temperature zones in the flames with the present method resulted in homogenous temperature profiles in the glass melt as a result of uniform heat fluxes as shown in FIG. 10B.

The results of the foregoing tests are shown in TABLE 1. The third column in TABLE 1 shows that the uniformity of the glass melt temperature has increased about 400% by using the method of the present invention. This effect is remarkable in view of the large thermal inertia of the furnace, as in this test only two of the total eighteen burners were equipped with the oxygen lances of the present invention.

TABLE 1

SUMMARY OF TYPICAL TEMPERATURE PROFILES OF GLASS-MELT SURFACES DURING REVERSAL

| Run | Type of Lance | Tma [K] | Tmin [K] | $\frac{Tmax - Tmin}{Tc}$ |
|---|---|---|---|---|
| Control | No Oxygen lances | 1588 | 1650 | 0.72 |
| Control | Convent. lances | 1580 | 1666 | 1.00 |
| 1 | nonaxisym. lances (1 cycle) | 1564 | 1588 | 0.28 |
| 2 | nonaxisym. lances (24 hrs.) | 1675 | 1697 | 0.26 |

Tc = Tmax − Tmin for the conventional lances.

As can be seen from the results provided in TABLE 1, the novel flat-jet lances of the present invention surprisingly produced significantly improved uniformity of the temperature of the glass-melt surface as compared to a conventional oxygen lance.

EXAMPLE 2

The effect on flame geometry development between a nonaxisymmetric lance (FIG. 2) and an axisymmetric lance (FIG. 1) was quantitatively compared. For this comparison, a flat jet of oxygen was chosen as characteristic for a nonaxisymmetric jet of a reaction-rate enhancing gas blend. The flat jet was directed virtually parallel to a high-speed, initially axisymmetric, turbulent diffusion flame. The initially axisymmetric turbulent diffusion flame was generated by igniting a high-velocity jet of methane emerging from a small round tube. The high Reynolds (Re) numbers at the burner tip are typical for industrial-type burner systems. The particular operating conditions are given in TABLE II.

TABLE II

OPERATING CONDITIONS

| Function | Gas | Avg. Velocity [m/s] | Size Inches | Re |
|---|---|---|---|---|
| Flame Envir. | Air | 0.62 | 4.00 dia. | — |
| Burner | Methane | 54.95 | 0.101 dia. | 8736 |
| Round-jet | Oxygen | 52.7 | 0.063 dia. | 5261 |
| Flat-jet | Oxygen | 52.7 | 0.01 × 0.338 | — |

Temperature profiles across the flame were taken with thermocouples in radial (r) direction at several axial (z) locations downstream of the burner tip. The thermocouples consisted of a very small (0.002″) thermocouple bead resulting from a head-to-head weld between PtRd 6%/PtRd 30% wires. The small diameter bead resulted in sufficient spacial resolution. As is common in combustion research, the wires were coated with a glass-like silica layer to prevent catalytical errors in the temperature measurements. Furthermore, with the well-known thermocouple-placement technique to minimize heat-conduction errors, the temperature profiles were representative of the true temperature profiles in the flame.

FIG. 12A shows the temperature profiles of the unmodified, i.e. no gas lance, methane turbulent diffusion flame at several locations downstream of the burner tip wherein:

z = the distance downstream from the burner tip
r = the distance from the burner axis
$D_o$ = the burner diameter $R_o$ = the burner radius The operating conditions are listed in TABLE II.

FIG. 12A shows the well-known characteristic expansion of the M-shaped temperature profiles downstream of the burner. As the gas moves downstream, it heats up and reacts around the temperature-peak zones. The (turbulent) "diffusion" processes and the expansion of the hot gases tend to decrease the temperature gradients as the flame moves downstream of the burner tip. These temperature profiles provide a basis for comparing a flame modified with a conventional axisymmetric lance and a nonaxisymmetric lance in accordance with the subject method.

Figure 12B:
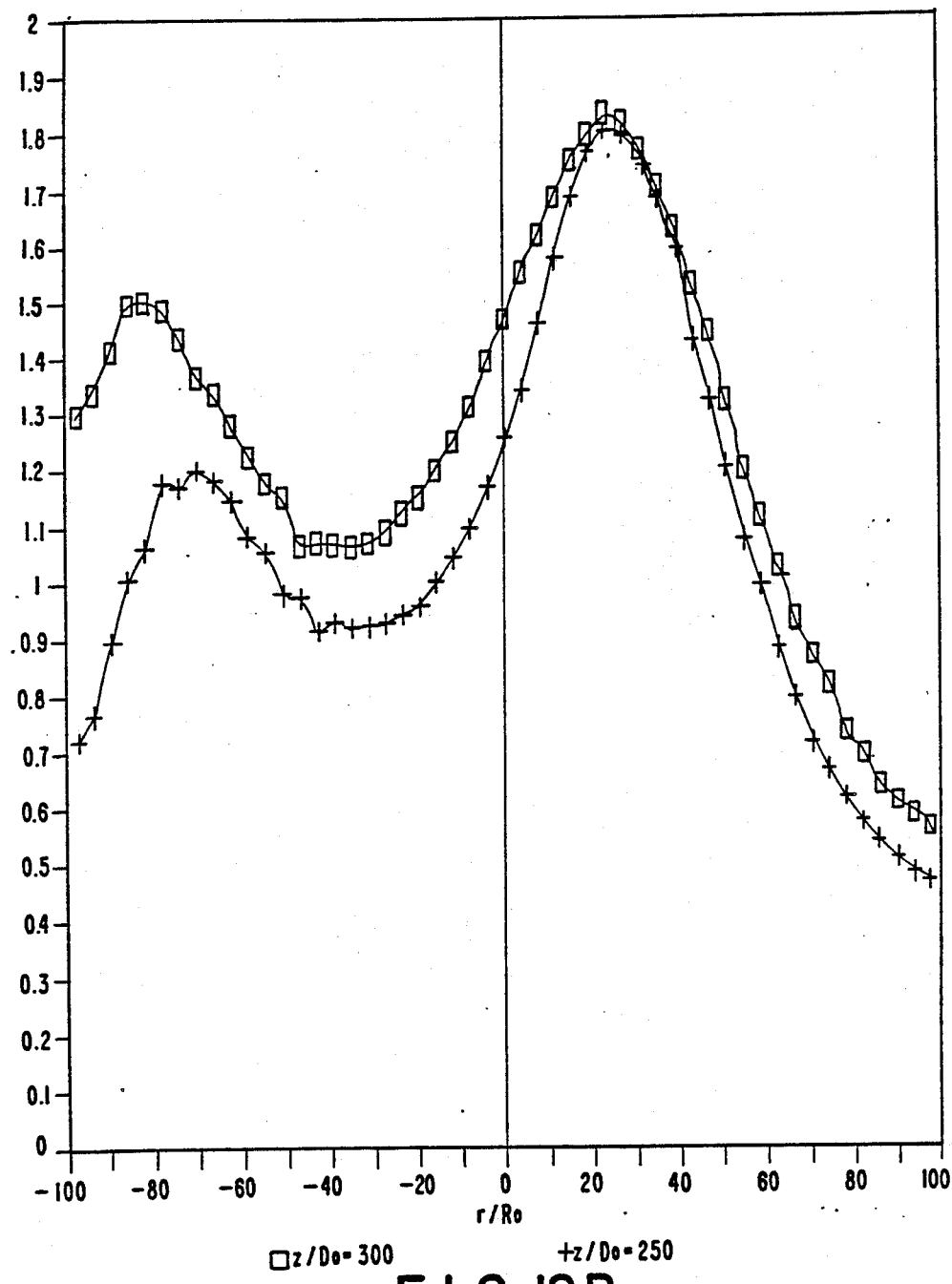
FIG. 12B is a graph showing horizontal temperature profiles of a flame downstream of a burner employing a conventional axisymmetric lance.

The modification of the temperature profiles with an axisymmetric oxygen jet is shown in FIG. 12B. The axis of the jet was located 2.37 burner diameters to the right of the burner axis and was directed virtually parallel to the burner axis.

The temperature peak in FIG. 12A displays a dramatic increase at the region of oxygen injection. However, the temperature profiles show smaller temperature gradients at the right, "leading edge", side of the flame where the oxygen was introduced. Furthermore, a comparison of FIGS. 12A and 12B shows that the left flame zone has been displaced away from the burner axis.

Figure 12C:
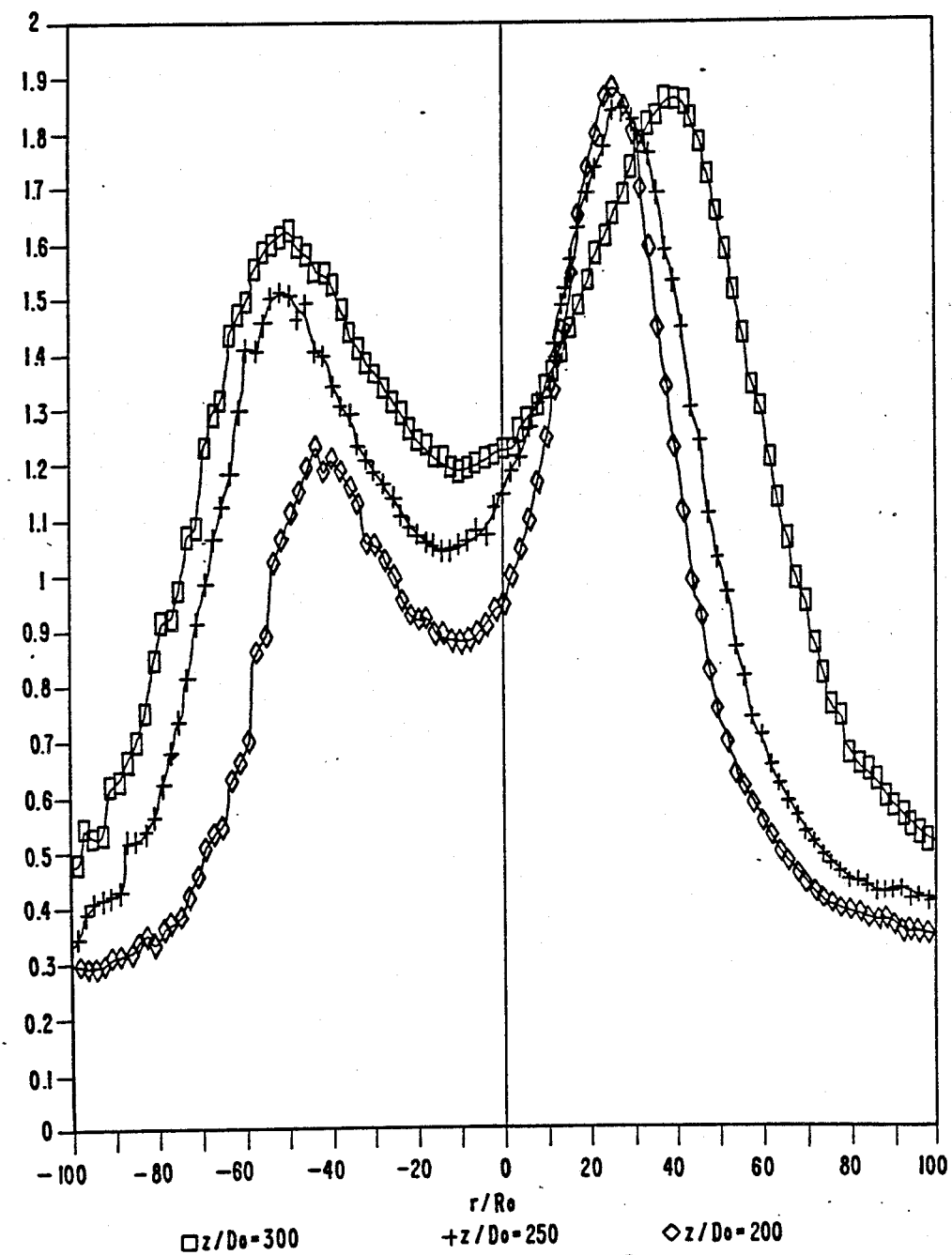
FIG. 12C is a graph showing horizontal temperature profiles of a flame downstream of a burner employing a nonaxisymmetric lance in accordance with the present invention.

FIG. 12C shows the dramatic changes in the temperature profiles using the lance of the present invention. The axis of the nonaxisymmetric jet was located 2.37 burner diameters to the right of the burner axis and was directed virtually parallel to the burner axis. Similarly, as with the axisymmetric lance, the dramatic temperature increase over the case without oxygen injection at the right, "leading edge", side of oxygen introduction is maintained throughout the interval of measurements.

However, several important improvements of the flame profile are obtained. The leading-edge temperature gradients are not only approximately 40% higher than the unlanced flame, but are about 50% higher than the axisymmetric lance flame. In addition, the flame-spread angle, i.e. the angle of an equivalent cone formed by the locus of the maximum temperatures in the flame is about 50% lower than the axisymmetric lanced flame and about 70% lower than the unlanced flame. The results are shown in TABLE III.

TABLE III

SUMMARY OF RESULTS

| | Turbulent flame | | Turb. Flame + axisym $O_2$ jet | | Turb. Flame + flat $O_2$ jet | |
|---|---|---|---|---|---|---|
| $z/D_o$ | dT/dr [K/cm] | Flame spread angle | dT/dr [K/cm] | Flame spread angle | dT/dr [K/cm] | Flame spread angle |
| 200 | −362.5 | | | | −457.3 | |
| 250 | −259.9 | | −233.7 | | −346.5 | |
| | | 22.4 | | 13.3 | | 6.8 |
| 300 | −208.9 | | −193.9 | | −298.4 | |

Both the axisymmetric and the nonaxisymmetric lances create a low static-pressure zone around $r/R_o$ = 4.74 where the oxygen is injected. As a result, the high temperature zones on the right side in the M-shaped temperature profiles of FIG. 12A are displaced to the left, towards $r/R_o$ = 4.74. For the axisymmetric lance, the high temperature zone on the left (FIG. 12B) is displaced further away from the burner axis. For the nonaxisymmetric lance, however, the high temperature zone on the left is displaced toward the low static pressure zone of oxygen injection as shown in FIG. 12C. Thus, the nonaxisymmetric lance not only displaces the right high-temperature reaction zone but also the left high-temperature zone which deforms the flame into a more favorable geometry. As shown in FIG. 12C, not only flame deformation, but also displacement of the entire flame has occurred which provides greater control over flame placement.

Moreover, it is apparent from a comparison of FIGS. 12A and 12B that the spreading of the flame in the direction of the line from the center of the burner tip to the center of the lance is much more limited by the nonaxisymmetric lance. In addition, a comparison of FIGS. 12B and 12C shows that the nonaxisymmetric lancing method is superior in maintaining a desirable high temperature gradient at the location where the oxygen is introduced.

EXAMPLE 3

The effect of global enhancement of the flame displacement and deformity of the type of lance/burner arrangement shown in FIG. 7A was quantitatively determined.

Oxygen was selected as the reaction rate enhancing gas and methane as the fuel. The Reynolds (Re) numbers at the burner tip are typical for an industrial type burner system. The particular operating conditions are shown in TABLE IV.

TABLE IV

OPERATING CONDITIONS

| Function | Gas | Avg. Velocity [m/s] | Size [Inches] |
|---|---|---|---|
| Flame Envir. | Air | 0.62 | 4.00 dia. |
| Fuel Nozzle | Methane | 16.1 | 0.334 × 0.374 |
| Gas Nozzle | Oxygen | 42.1 | 0.334 × 0.276 |

The separation between oxygen exit port 31 and the fuel exit port 64 as shown in FIG. 7A was 0.2 inch. The Cartesian coordinate system (axes X, Y, Z) shown in FIG. 7A has the origin located in the center between the oxygen exit port 31 and the fuel exit port 64 at the point of symmetry in the Y-direction, and on the face of the burner.

Similar procedures as described in Example 2 were employed. Temperature profiles across the flame were taken in the X-axis direction across the globally-enhanced flame sheet at several locations downstream of the burner. The results are plotted in FIG. 13.

Figure 13:
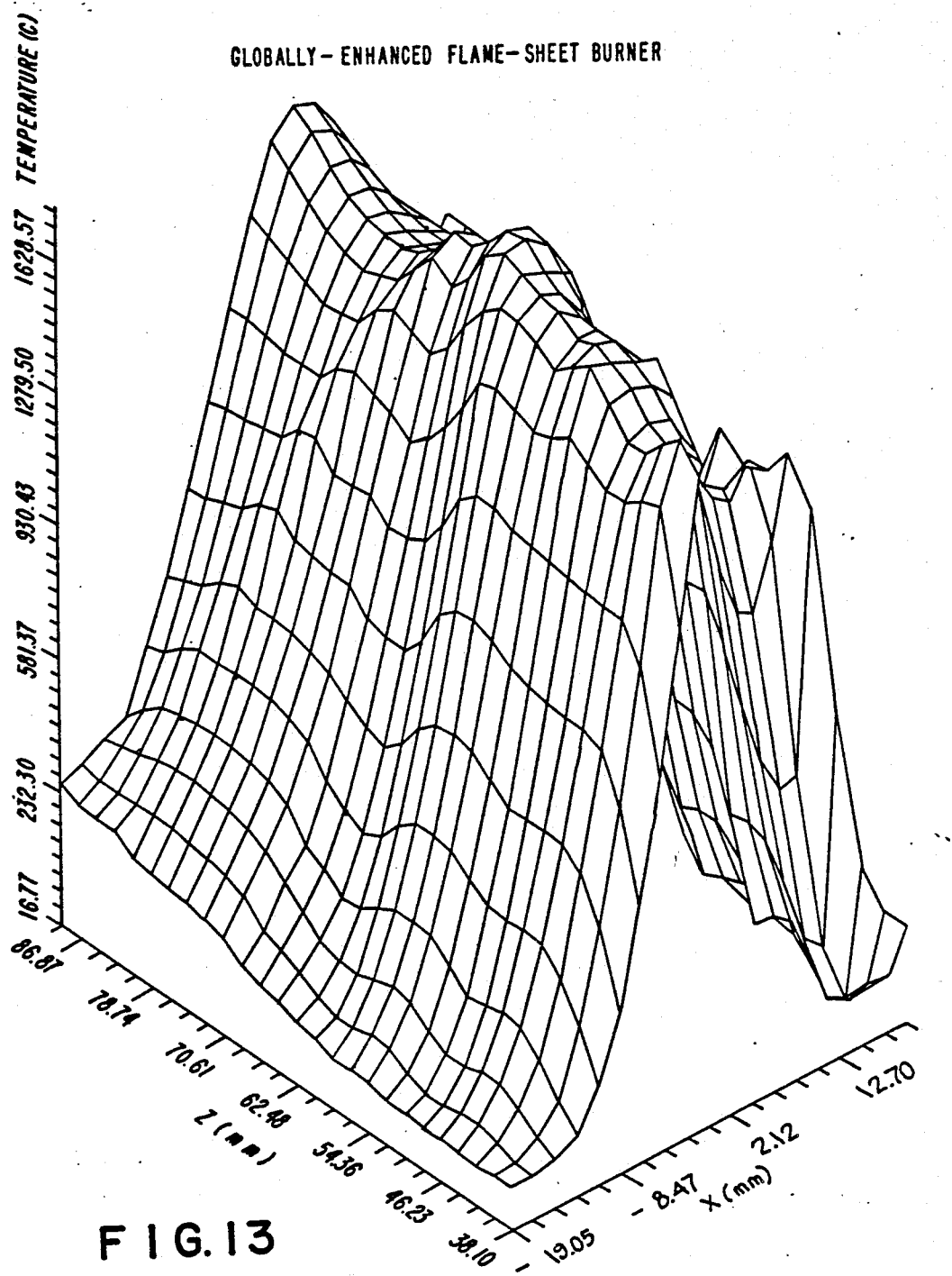
FIG. 13 is a graph plotting the spacial temperature distribution in a plane Y=O (FIG. 7A)

As shown in FIG. 13, measurements taken close to the burner show the characteristic "M" profile. The lower temperatures in the center of the profile result from "cold" unreacted fuel. Shortly downstream, however, only a hat profile was measured. In addition, there was virtually no lateral flame expansion in the X-direction.

Figure 14:
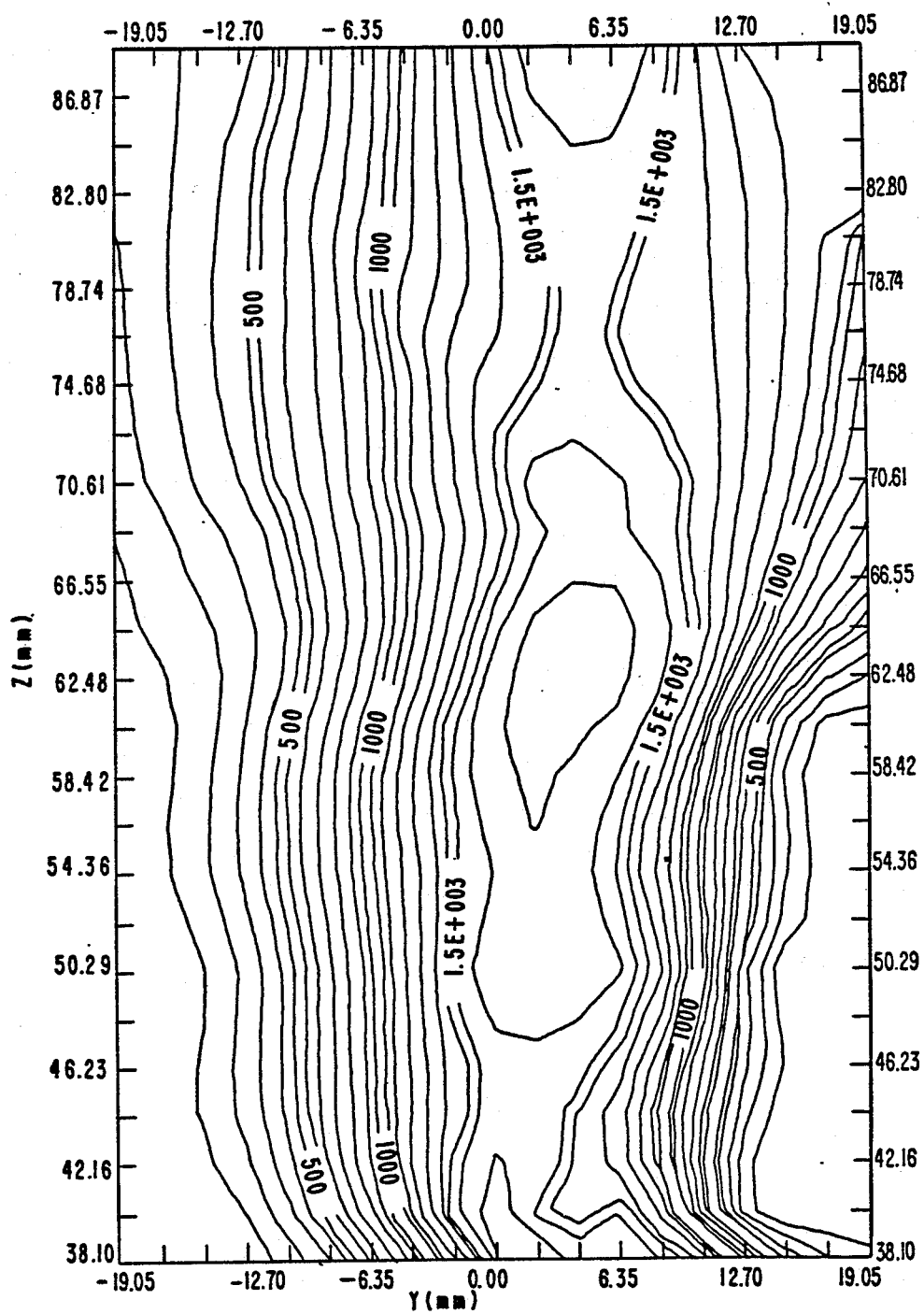
FIG. 14 is a plot showing the spacial distribution of the isotherms in a plane Y=O according to FIG. 7A.

Referring to FIG. 14, the temperature profile on the oxygen side (left side of FIG. 14) is well-defined, sharp and planar. The isotherms on the fuel side (right side of FIG. 14) show the strong attraction of the flame to the oxygen jet. The significant curvature of the isotherms on the fuel side are indicative of the desired aerodynamically reduced pressure field which controls the favorable positioning and desired shape of the flame.

What is claimed is:

1. In a method of heating a surface comprising providing a burner system which produces a flame extending over said surface and providing one or more reaction-rate enhancing gas lances between the burner system and the surface, said lances producing a jet of said gas between the flame and the surface, the improvement comprising emitting said reaction rate enhancing gas such that the point of exit of the gas taken perpendicular to the longitudinal axis of the flow of the gas is essentially non-circular, thereby enhancing the uniformity of heating by producing a jet which creates an aerodynamically reduced pressure field thereby deforming the flame and displacing the flame toward the surface.

2. The method of claim 1, wherein the gas lance is directed toward or away from the longitudinal axis of the flame by an angle not exceeding about 45°.

3. The method of claim 2, wherein the gas lance is substantially parallel to the longitudinal axis of the flame.

4. The method of claim 1, wherein the reaction rate enhancing gas is oxygen.

5. The method of claim 1, further comprising emitting said flame wherein the point of exit of the flame taken perpendicular to the longitudinal axis of the flow of the flame is essentially non-circular.

* * * * *